United States Patent
Centonze et al.

(10) Patent No.: US 8,230,477 B2
(45) Date of Patent: Jul. 24, 2012

(54) SYSTEM AND METHOD FOR THE AUTOMATIC EVALUATION OF EXISTING SECURITY POLICIES AND AUTOMATIC CREATION OF NEW SECURITY POLICIES

(75) Inventors: Paolina Centonze, Amawalk, NY (US); Marco Pistoia, Amawalk, NY (US)

(73) Assignee: International Business Machines Corporation, Armonk, NY (US)

( * ) Notice: Subject to any disclaimer, the term of this patent is extended or adjusted under 35 U.S.C. 154(b) by 1242 days.

(21) Appl. No.: 11/677,298

(22) Filed: Feb. 21, 2007

(65) Prior Publication Data
US 2008/0201760 A1  Aug. 21, 2008

(51) Int. Cl.
*G06F 21/00* (2006.01)
(52) U.S. Cl. .............................. 726/1; 717/126; 717/133
(58) Field of Classification Search .................. None
See application file for complete search history.

(56) References Cited

U.S. PATENT DOCUMENTS

| | | | | |
|---|---|---|---|---|
| 7,962,901 B2* | 6/2011 | Mccamant et al. | ........... | 717/131 |
| 8,006,233 B2* | 8/2011 | Centonze et al. | ............. | 717/126 |
| 2002/0184486 A1* | 12/2002 | Kershenbaum et al. | ...... | 713/150 |
| 2003/0212924 A1* | 11/2003 | Avvari et al. | .................... | 714/38 |
| 2004/0040017 A1* | 2/2004 | Kershenbaum et al. | ...... | 717/158 |
| 2005/0010804 A1* | 1/2005 | Bruening et al. | ............. | 713/200 |
| 2005/0015752 A1* | 1/2005 | Alpern et al. | .................. | 717/131 |
| 2005/0055565 A1* | 3/2005 | Fournet et al. | ................ | 713/200 |
| 2005/0065973 A1* | 3/2005 | Steensgaard et al. | ..... | 707/103 Y |
| 2005/0071813 A1* | 3/2005 | Reimer et al. | ................. | 717/125 |
| 2005/0097528 A1* | 5/2005 | Chakrabarti et al. | ......... | 717/140 |
| 2005/0097533 A1* | 5/2005 | Chakrabarti et al. | ......... | 717/144 |
| 2005/0188364 A1* | 8/2005 | Cockx et al. | .................. | 717/159 |
| 2005/0262487 A1* | 11/2005 | Pistoia et al. | ................. | 717/143 |
| 2007/0016894 A1* | 1/2007 | Sreedhar | ........................ | 717/131 |
| 2007/0180441 A1* | 8/2007 | Ding et al. | .................... | 717/163 |
| 2007/0261124 A1* | 11/2007 | Centonze et al. | ............... | 726/27 |
| 2008/0201688 A1* | 8/2008 | Centonze et al. | ............. | 717/104 |
| 2008/0201693 A1* | 8/2008 | Centonze et al. | ............. | 717/118 |
| 2008/0201760 A1* | 8/2008 | Centonze et al. | ................. | 726/1 |
| 2008/0229278 A1* | 9/2008 | Liu et al. | ...................... | 717/106 |

(Continued)

FOREIGN PATENT DOCUMENTS

FR  2868566 A1 * 10/2005

OTHER PUBLICATIONS

Koved, Larry, et al. "Access Rights Analysis for Java" ACM. OOPSLA '02, Nov. 4-8, 2002.*

(Continued)

*Primary Examiner* — Nathan Flynn
*Assistant Examiner* — Michael R Vaughan
(74) *Attorney, Agent, or Firm* — Cantor Colburn LLP; Brian Verminski

(57) ABSTRACT

The present invention relates to methodologies for combining policy analysis and static analysis of code and thereafter determining whether the permissions granted by the policy to the code and to the subjects executing it are appropriate. In particular, this involves the verification that too many permissions have not been granted (wherein this would be a violation of the Principle of Least Privilege), and that the permissions being granted are sufficient to execute the code without run-time authorization failures, thus resulting in the failure of the program to execute.

19 Claims, 6 Drawing Sheets

U.S. PATENT DOCUMENTS

2008/0306958 A1* 12/2008 Sreedhar ............... 707/9

OTHER PUBLICATIONS

Naumovich, G. 2002. A conservative algorithm for computing the flow of permissions in Java programs. In Proceedings of the International Symposium on Software Testing and Analysis (ISSTA). pp. 33-43.*

P. Centonze, G. Naumovich, S. J. Fink, and M. Pistoia. Role-Based Access Control Consistency Validation. In Proceedings of the 2006 International Symposium on Software Testing and Analysis (ISSTA 2006), pp. 121-132, Portland, ME, USA, 2006. ACM Press.*

Barbara G. Ryder, "Dimensions of Precision in Reference Analysis of Object-Oriented Languages", in Proceedings of the 12th International Conference on Compiler Construction, pp. 126-137, Warsaw, Poland, Apr. 2003, Invited Paper.

Lai et al., "User Authentication and Authorization in the JavaTM Platform", in Proceedings of the 15th Annual Computer Security Applications Conference, pp. 285-290, Scottsdale, AZ USA, Dec. 1999, IEEE Computer Security.

Saltzer et al., "The Protection of Information in Computer Systems", in Proceedings of the IEEE, vol. 63, pp. 1278-1308, Sep. 1975.

Paul et al., "NET Security: Lesson Learned and Missed from Java", Univ. VA, Dept. Computer Science. In Proceedings of the ACSAC, pp. 1-10, Dec. 2004.

* cited by examiner

```
import java.io.*;
import java.net.*;
public class LibraryCode { private static String logFileName = "audit.txt";
    public static Socket createSocket(String host, int port)
        throws UnknownHostException, IOException {
        // Create the Socket
        Socket socket = new Socket(host, port);
        // Log the Socket operation to a file
        FileOutputStream fos = new FileOutputStream(logFileName);
        BufferedOutputStream bos = new BufferedOutputStream(fos);
        PrintStream ps = new PrintStream(bos, true);
        ps.print("Socket " + host + " : " + port);
        return socket;
    }
}
```

FIG. 3

```java
import java.io.*;
import java.net.*;
import java.security.*;
public class LibraryCode2 {
    private static final String logFileName = "audit.txt";
    public static Socket createSocket(String host, int port) throws
        UnknownHostException, IOException, PrivilegedActionException {
        // Create the Socket
        Socket socket = new Socket(host, port);
        // Log the Socket operation to a file using doprivileged
        File f = new File(logFileName);
        PrivWriteOp op = new PrivWriteOp(host, port, f);
        FileOutputStream fos = (FileOutputStream)
            AccessController.doprivileged(op);
        BufferedOutputStream bos = new BufferedOutputStream(fos);
        PrintStream ps = new PrintStream(bos,true);
        ps.print("Socket .. " + host + ":" + port) ;
        return socket;
    }
}
class PrivWriteOp implements PrivilegedExceptionAction {
    private File f;
    PrivWriteOp (File f) {
        this.f = f;
    }
    public Object run() throws IOException{
        return new FileOutputStream(f);
    }
}
```

FIG. 5

SYSTEM AND METHOD FOR THE AUTOMATIC EVALUATION OF EXISTING SECURITY POLICIES AND AUTOMATIC CREATION OF NEW SECURITY POLICIES

BACKGROUND OF THE INVENTION

1. Field of the Invention

This invention relates to the evaluation of security policies within a computing system, and particularly to the evaluation of security policies and the creation of new security policies within a computing system.

2. Description of Background

Before our invention computing system frameworks, such as Java™ and Microsoft™.NET Common language Runtime (CLR) were considered to be sophisticated enough to allow for the specification of complex and fine-grained security policies. Typically, these security policies included the ability to specify the access rights that were required to be granted to code and to the subjects (users and/or services) running the code. In regard to implemented security policies two fundamental rules must be respected: First, the access rights granted to code and subjects must have been sufficient to run the code (otherwise there will be authorization failures at run time, which may make an application unstable), and secondly, none of the access rights granted to code and subjects must be unnecessary or redundant; this aspect being required to avoid violating the Principle of Least Privilege.

However, given the complexity of modern, fine-grained computing systems, defining an access policy based on the requirements of the code is very difficult, if not impossible. Defining an access policy may require the procedure of manually inspecting the code, understanding what permissions the code requires, and detecting which portions of code are going to be executed under the authority of subjects. Moreover, a policy should grant the permissions required by the code to either the code or the subjects executing the code (ideally not to both, as this would be a violation of the Principle of Least Privilege). On the other hand, if a policy has already been defined, evaluating it requires, as mentioned above, inspecting the code, understanding what permissions the code requires, detecting which portions of code are going to be executed under the authority of subjects. Further, the permissions the current policy grants to the code and the subjects executing the code must be identified and the following must be verified:

1. The code and/or the subjects executing the code have been granted enough permissions so that the application can execute without authorization failures (this aspect can create exploitable run-time problems), as long as the code and/or the subjects are trusted enough to be granted those permissions, and
2. The code and/or the subjects executing the code have not been granted unnecessary or overlapping permissions (which would constitute a violation of the Principle of Least Privilege).

Policy defining procedures are further complicated by the fact that permissions granted to a subject are obtained as the union of the permissions that have been granted to the subject's authenticated principals. Therefore, it is necessary to detect for each subject what permissions its authenticated principal have been granted. Performing manual code and security-policy inspection to define a new security policy or evaluate an existing one is a tedious, error prone, and time consuming procedure. Dynamic analysis or testing is another approach typically undertaken to solve authorization problems. However, in the absence of a complete suite of test eases, this approach is not guaranteed to detect all the authorization requirements of a program, and further, unexpected run-time authorization failures can arise.

Therefore there exists a need for a methodology for combining policy analysis and static analysis of code in order to compute whether the permissions granted, by the policy to code and to the subjects executing the code are appropriate. Further, this need extends to the implementation of a methodology for verifying that too many permissions have not been granted (otherwise, this would be a violations of the Principle of Least Privilege), and that the permissions being granted are sufficient to execute the code without run-time authorization failures (in this instance the program will not execute).

SUMMARY OF THE INVENTION

The shortcomings of the prior art are overcome and additional advantages are provided through the provision of a method for the evaluation of security policies and the creation of security polices, the method further comprising the steps of creating a static model of a program, wherein the static model comprises: an invocation graph, the invocation graph comprising a set of nodes and a set of edges, the invocation graph being configured to visually represent programming methods as nodes, and the calling context that is associated with a respective programming method; and a points-to graph, the points-to graph being configured to model the dependencies that exist between program objects, and determining an analysis domain for a plurality of sets of Permission objects.

The method further comprises the steps of determining a set of explicitly granted permissions for respective program methods, determining a set of permissions that have been granted to each subject object, determining a set of subject-granted permissions that respective subject-executed code receives as a result of being executed by a subject object, determining a set of permissions that are required by the program code, performing a policy evaluation operation upon each identified method node; and annotating the invocation graph with information that is determined from the policy evaluation operation.

Computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 illustrates one example of library code for the propagation of authorization requirements to clients.

FIG. 5 illustrates one example of library using privilege code.

The detailed description explains the preferred embodiments of the invention, together with advantages and features, by way of example with reference to the drawings.

DETAILED DESCRIPTION OF THE INVENTION

One or more exemplary embodiments of the invention are described below in detail. The disclosed embodiments are intended to be illustrative only since numerous modifications and variations therein will be apparent to those of ordinary skill in the art.

Aspects of the present invention relate to the performance of static code analysis procedures, wherein the static code analysis is performed in accordance with formal analysis methodologies. Aspects of the present invention may be implemented within conventional computing systems, wherein the static analysis methodologies, as discussed herein, can be performed in accordance with conventional automated analysis tool methodologies.

The Java™ 2 and CLR programming models are extensively used in multiple types of Internet applications, especially applications relating to electronic commerce. Due to the distributed nature of such applications it is essential that when access to a restricted resource is attempted all code currently on a call stack is authorized to access the restricted resource. In Java™ 2, when access to a restricted resource is attempted the SecurityManager, if active, triggers access-control enforcement protocols by invoking an AccessController.checkPermission method command. This method utilizes a Permission object p as a parameter, and performs a stack walk to verify that each caller in a current thread of execution has been granted the access right that is represented by p.

Figure 1:
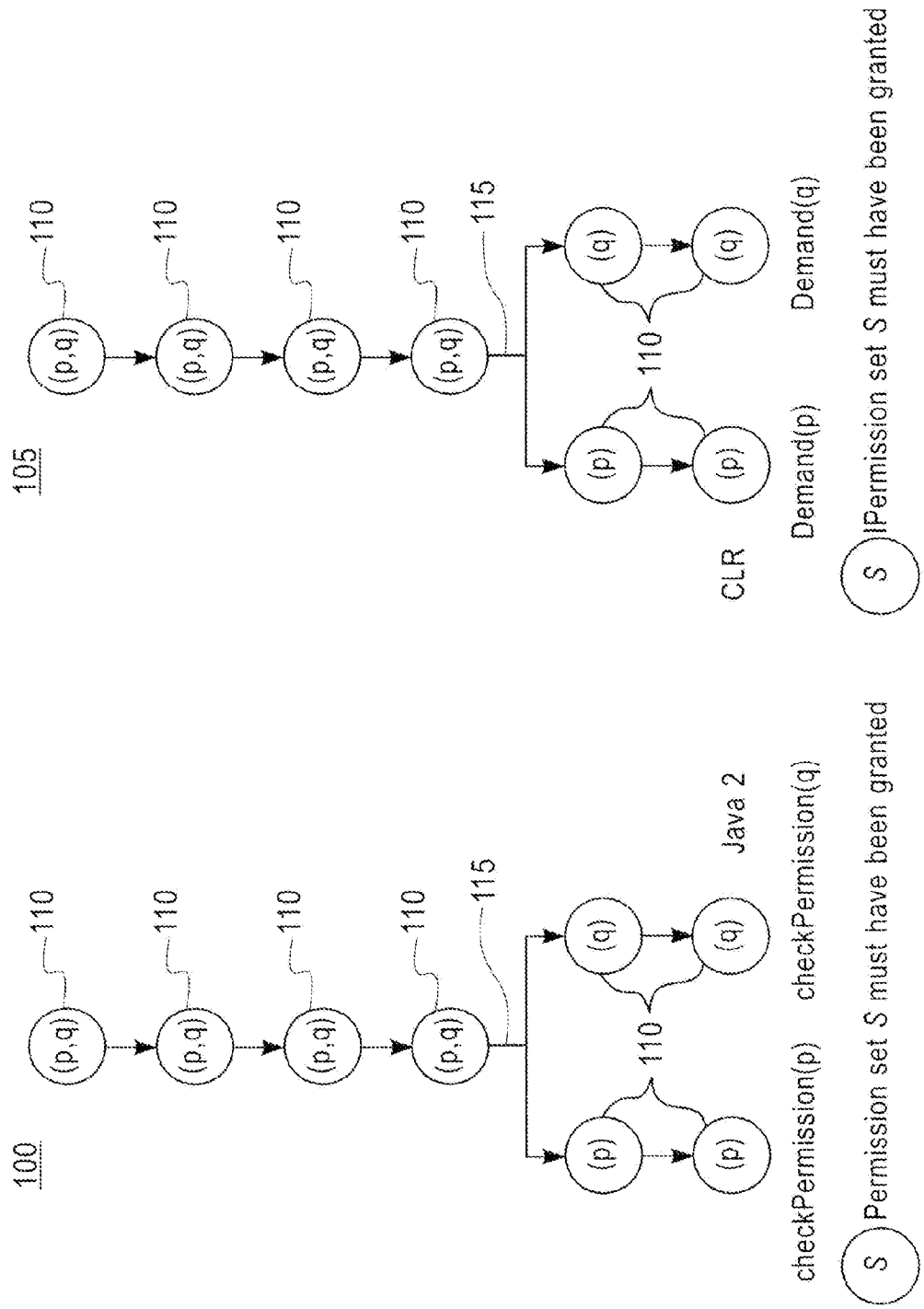
FIG. 1 illustrates one example of representing the executions of two program threads within a Java™ 2 and CLR SBAC system.

In CLR, the stack walk is performed by the Demand method, which verifies that all the code currently on the stack has been granted the access right represented by a given IPermmision object. FIG. 1 illustrates a comparison between the Java™ 2 100 and CLR 105 SBAC systems. The two directed graphs in FIG. 1 represent the executions of two program threads (100, 105) on a Java™ 2 and CLR platform, respectively, where the vertices 110 in the graphs are representative of method invocations. If two vertices 110 are connected by an edge 115, that means that the method represented by the predecessor vertex 110 in the edge 115 invokes the method represented by the successor vertex 110. In both platforms (100, 105), when stack based access control (SBAC) is enforced, a SecurityException is thrown if any one of the callers on the call stack does not have the appropriate access right.

Access Rights

Though programmatic security is possible, within both the Java™ 2 and CLR platforms, access rights are preferably declaratively granted. Within both platforms a system administrator grants access rights in a security policy database that is external to the application code; this aspect enhances code portability and reusability. Typically, in SBAC systems, access rights are by default denied to all code and subjects. Untrustworthy code and subjects will only be allowed to perform basic operations that cannot harm the system. For a restricted operation to succeed, all the code on the thread's stack must be explicitly granted the right, to execute that operation.

Within Java™ 2, access rights are represented as objects of type Permission. Each Permission type must be a subclass of the Permission abstract class. When a Permission object is constructed, it can take zero (0), one (1), or two (2) string objects as parameters. If present, a first parameter is called the target of the Permission object and represents the resource that is being protected, whereas the second parameter is called the action of the Permission object and represents the mode of access. The target and action are used to qualify the resource being protected by the Permission object. For example, the following line of code can be used to construct a Permission object representing the right to access the log.txt file in read and write mode:

Permission p=new FilePermission ("log.txt", "read, write");

Given a Permission object p, p's fully qualified Permission class name along with p's target and action, if any, uniquely identify the authorization requirement represented by p. Therefore, for authorization purposes, a Permission object p can be characterized solely based on p's permission ID, which consists of p's fully qualified class name and the values of the String instances used to instantiate p. Moreover, in the Java™ 2 Runtime Environment (J2RE) reference implementation, authorizations are granted to programs and principals by just listing the corresponding permission IDS in a flat-file policy database, called the policy file.

The Permission class contains an abstract method named implies, which itself takes a Permission object as a parameter and returns a Boolean value that every non-abstract Permission subclass must implement. If p and q are two Permission objects and p.implies (q) returns true, then this means that, granting p is implicitly equivalent to having granted q as well. For example, p could be the Permission object constructed above and q could be the Permission object constructed, with the following line of code:

Permission q=new FilePermission ("log.txt", "writes");

If p is an instance of the AllPermission class, then p.implies (q) returns true for any Permission object q.

Access rights may be granted to code based on the code source, which is a combination of the code base (i.e., the network location from which the code is coming) and the digital certificates of the entities that digitally signed the code. In Java™ 2, access rights are granted to classes, wherein each class is loaded at run time by a class loader. Class loaders are organized as a tree, the tree being referred to as the classloading delegation tree. A class loader, when it loads a class, constructs a protection domain characterizing the origin of the class being loaded, and associates it with the class itself. A protection domain, which is represented as an object of type ProtectionDomain, encapsulates the class' code source (which is represented as a Codesource object) and a PermissionCollection object that contains all of the Permissions corresponding to the access rights that have been granted to the code source. When invoked with a Permission p as a parameter, checkPermission performs a stack walk and verifies that each of the ProtectionDomains in the current thread of execution contains at least one Permission that implies p. The set of Permissions effectively granted to a thread of execution is the intersection of the sets of Permissions implied by all of the ProtectionDomains associated with the stack. Access-control enforcement employed on a CLR platform is implemented in a similar manner.

From a security point-of-view, it should be noted that violations of the Principle of Least Privilege could arise in the instance that unnecessary rights are granted to code. Conversely, if the rights granted to code are insufficient to meet the code's security requirements, run-time authorization failures may then occur; such an occurrence can cause an application to crash.

Privilege-Asserting Code

Often, trusted library code is programmed to perform access-restricted operations—such operations as writing to a log file or reading from a configuration file that an untrustworthy client did not explicitly request. Since the untrustworthy client will be on the call stack when access control is enforced, the operation will not succeed unless the client code is authorized as well. To avoid authorizing the client (this action constituting a violation of the Principle of Least Privilege) the portion of library code performing the restricted operation can be made privileged.

In Java™ 2, a block of library code is made privilege-asserting by wrapping the code within a call to AccessController.doPrivileged. This method takes either a PrivilegedAction or a PrivilegedExceptionAction parameter, whose run method contains the portion of code that needs to be made privileged. When access control is enforced, the presence of privilege-asserting code on the call stack causes the stack walk to stop at the stack frame corresponding to the library method calling doPrivileged. As a result, the library code calling doPrivileged must have been granted the right to perform the restricted operation, but the client code is implicitly granted that right while the current thread is executing. A potential problem generated by doPrivileged is that if a call to doPrivileged leads to multiple checkPermission calls with different, Permissions being checked, all those Permissions will be implicitly indiscriminately granted to client code.

Figure 2:
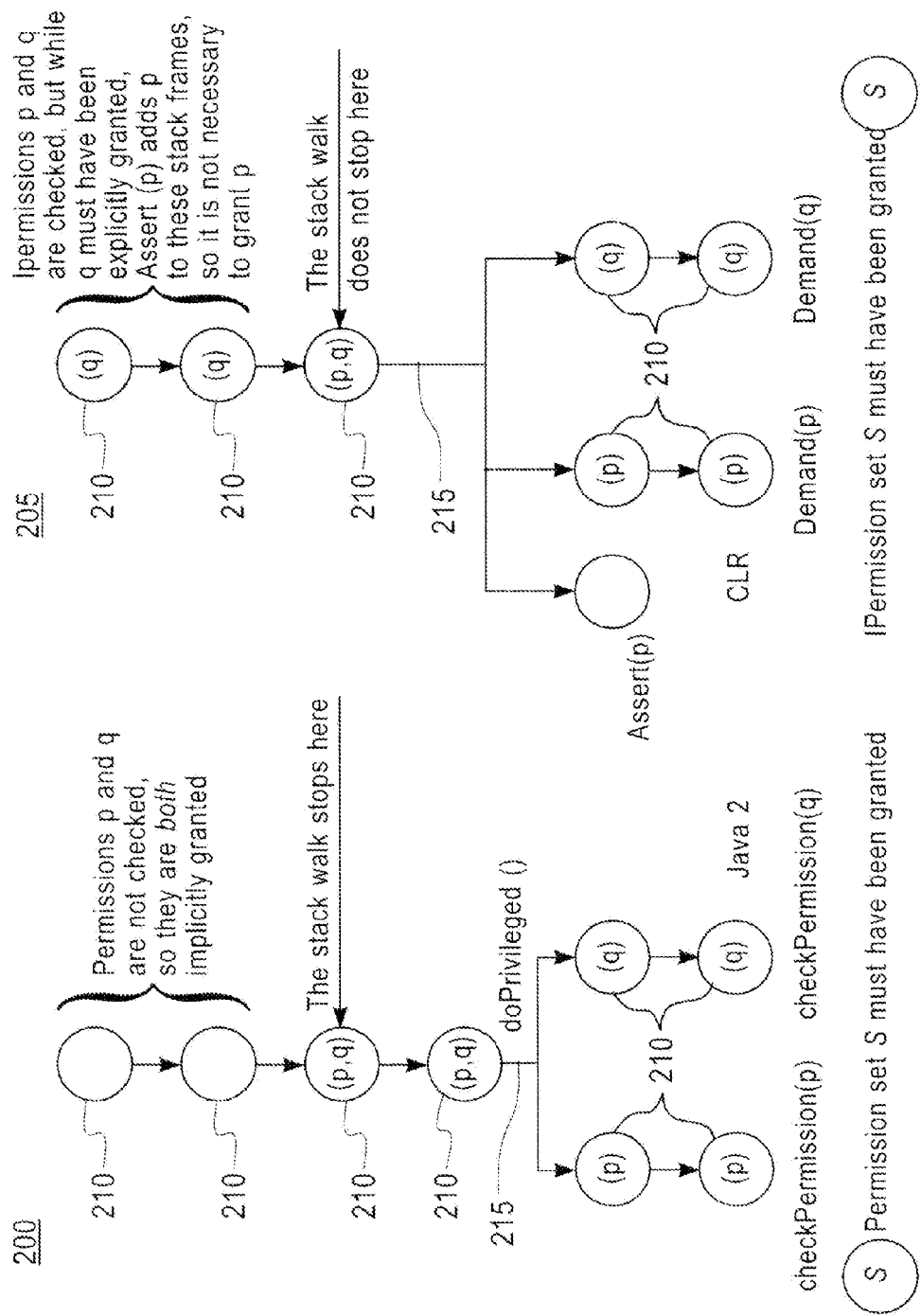
FIG. 2 illustrates one example of privilege code in the Java™ 2 and CLR SBAC system.

In CLR, the mechanism for privilege-asserting code is more granular. To make code privileged, a trusted library code must call the Assert method with an IPermission object p as a parameter. The difference from Java's™ doPrivileged is that Assert does not cause the stack walk to stop, but instead adds p to the stack frames above the library method that makes the call to Assert. Therefore, unlike doPrivileged, Assert allows specifying exactly which access right should be implicitly granted to client code regardless of the IPermission being checked by the Demand method currently on the stack. FIG. 2 shows and compares how privilege-asserting code works in the Java™ 2 and CLR platforms, respectively.

The Java™ 2 platform offers another form of doPrivileged that takes an additional AccessConrolContext instance as an argument. This instance encapsulates an array of ProtectionDomain objects that are typically associated with the thread stack at the moment in which the AccessControlContext was instantiated. When it encounters a call from this form of doPrivileged, checkPermission stops its stack walk at the stack frame corresponding to the method that made that doPrivileged call. In addition, checkPermission performs an authorization test on each of the ProtectionDomains encapsulated in the AccessControlContext.

Figure 4:
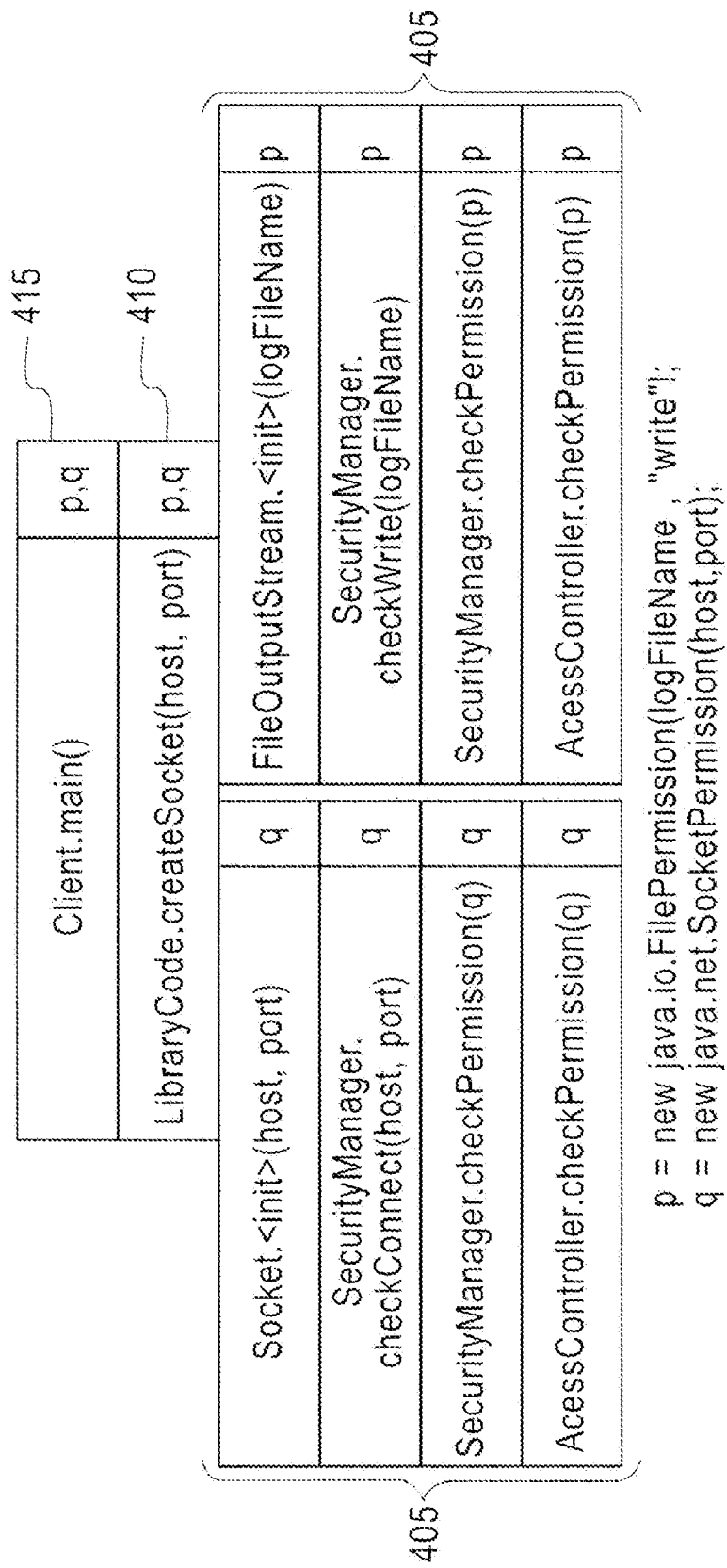
FIG. 4 illustrates one example of the propagation of unnecessary authorization requirements to client code.

In the instance that a client application makes a call to a trusted library, as part of the call operation the library often accesses restricted resources that the client never intended to, or does not need to directly access. For example, assume that a Java™ program is authorized to open a network socket. To do so, the program invokes createSocket on the LibraryCode library class as shown in FIG. 3. On opening a socket on behalf of a client program, the library is programmed to log the socket operation to a file for auditing purposes. As shown in FIG. 4, according to the Java™ 2 SBAC model, both the library 410 and its client 415 will need to be granted the FilePermission to modify the log file and the SocketPermmi-sion to create the socket connection (as dictated by the preceding methods 405), even though the client did not explicitly request to write to the log file. Granting that FilePermission to the client code would violate the Principle of Least Privilege.

A way to circumvent this problem is to mark the portion of the library code responsible for logging as privilege asserting code. On a Java™ 2 platform, this prevents the stack inspection for the log operation from going beyond the createSocket method, and further, temporarily exempts the client from the FilePermission requirement during the execution of createSocket. From a practical point of view, a Java™ developer must implement either the PrivilegedExceptionAction or PrivilegedAction interface depending on whether the privilege-asserting code could throw a checked Exception or not, respectively. Both the interfaces comprise a run method that, once implemented, must contain the portion of library code performing the restricted operation not directly requested by the client. Next, the PrivilegedExceptionAction or PrivilegedAction instance is passed as a parameter to the doPrivileged method, which will invoke the instance's run method.

Figure 6:
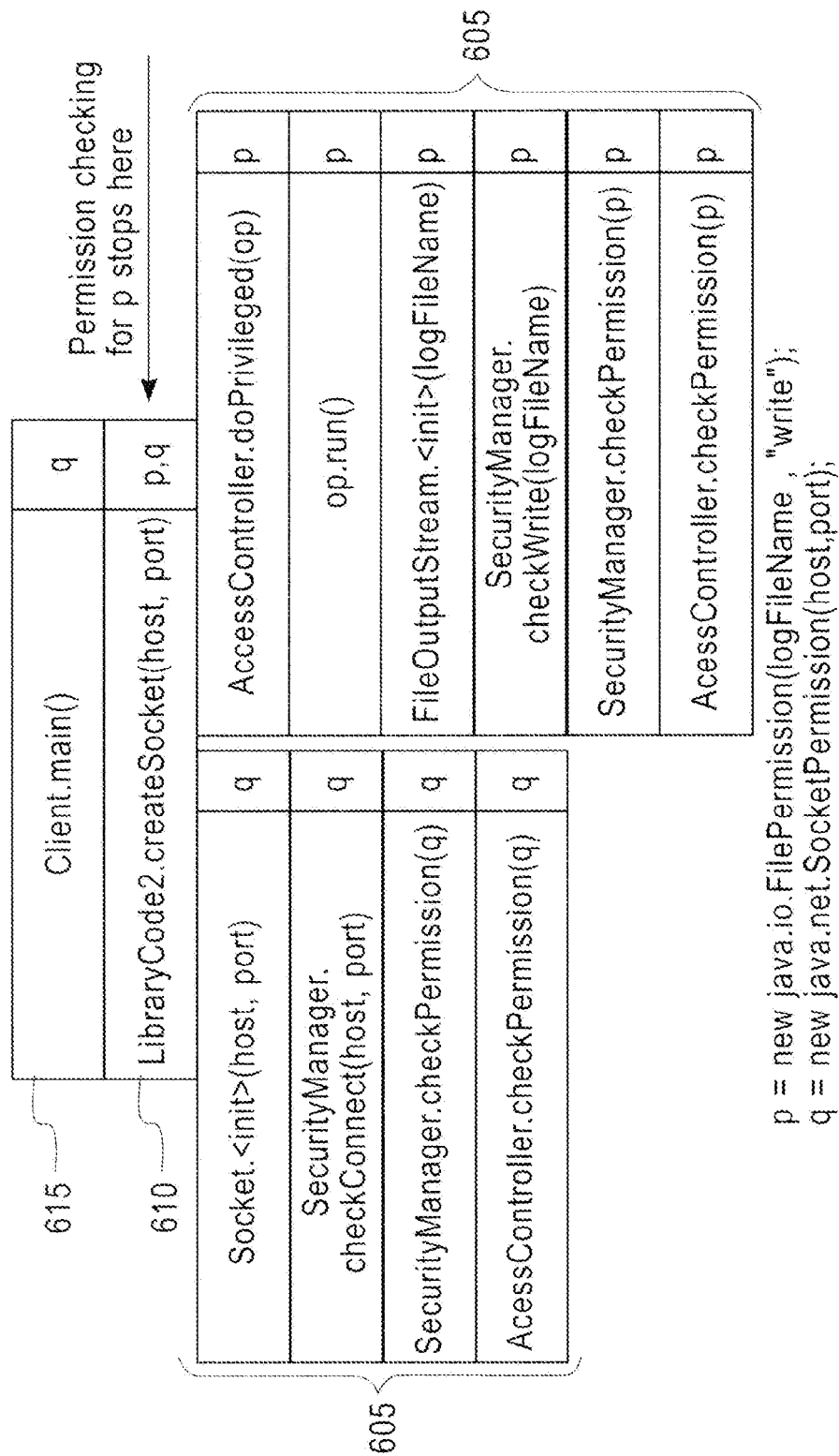
FIG. 6 illustrates one example of preventing the unnecessary authorization requirements for client code.

Class LibraryCode2, as shown in FIG. 5, is obtained by modifying the class LibraryCode of FIG. 3 after wrapping the call to the FileOutputStream constructor in a privileged block to prevent client code from requiring a Filepermission. As shown in FIG. 6, when the checkPermission method performs a stack walk to verify that all the code in the active calling sequence (605, 610, 615) has been granted the right to write to the log file, the LibraryCode2 610 class will be required to have the necessary FilePermission, but the client code 615 running on top of the LibraryCode2 610 will not be required to have the necessary FilePermission. However, the client code 615 will still be required to have the SocketPermission necessary to open the socket since the call to the Socket constructor in LibraryCode is not privileged.

In the Java™ 2 SBAC system, when access to a restricted resource is attempted from within a child thread, it is not just the code on the stack of the child thread that must be granted the right to perform the access-restricted operation, but all the code in the child thread and in all its ancestor threads. This is done to prevent a program from performing security-sensitive operations by simply spawning a new thread, which would have fewer classes associated with the runtime stack, and therefore be potentially more trusted than its ancestor threads.

Subject-Based Authorization

Both Java™ and CLR allow basing authorization decisions on the user or service (called the Subject) that is executing the code. Java™ Authentication and Authorization Service (JAAS) extends the Java™ 2 code-based access control framework to support subject-based authentication and authorization. In Java™, a subject is represented as an object of type Subject. When a subject is authenticated, the corresponding Subject instance is populated with associated identities called principals, represented as objects of type Principal. A subject may have multiple associated principals. For example, if the subject is a person, two of the subject's associated principals could be the person's name and social security number.

In Java™ 2, access rights are granted to code and principals, but not directly to subjects. The set of access rights granted to a subject is obtained as the union of the sets of access rights granted to the subject's authenticated principals. The JAAS framework offers the static methods Subject.doAs and Subject.doAsPrivileged to perform a restricted operation with the access rights granted to a subject.

The doAs method takes two parameters: the first is a Subject object, and the second is either a PrivilegedExceptionAction or PrivilegedAction object. The code in the nm method of the PrivilegedExceptionAction or PrivilegedAction instance is executed with the intersection of the sets of Permissions granted to the code on the call stack. However, doAs adds the Permissions granted to the subject's principals to the stack frames subsequent to the call to doAs.

The doAsPrivileged method is similar to doAs, but it takes a third parameter, an AccessControlContext object, which encapsulates an array of ProtectionDomains. Similar to doAs, the doAsPrivileged method also adds the Permissions granted to the subject's principals to the subsequent stack frames. However, unlike in the doAs case, when checkPermission is called with a Permission parameter p after a call to doAsPrivileged, the doAsPrivileged predecessors are not required to have been granted a Permission that implies p. Rather, doAsPrivileged interrogates the ProtectionDomains in the AccessControlContext passed to it as a parameter.

Violations of the Principle of Least Privilege may arise if any of the access rights granted to a subject's principals are unnecessary. Conversely, if the rights granted are insufficient to meet the security requirements of an application, run-time authorization failures may occur, which could cause the application to crash.

Aspects of the present invention are directed to methodologies for the static determination of optimal security policies that are necessitated for the execution of program code. Embodiments for the security policy analysis described in relation to a SB AC system. Such a system includes the possibility to grant access rights to a program and to the subjects executing it.

Static Representation of a Program Execution

The first step of the security policy analysis consists of statically modeling the execution of the program. From the program object code, an invocation graph G=(N, E) and a points-to graph (G'=(N', E') are constructed. The invocation graph G shows the methods that each method respectively invokes. Preferably, the invocation graph possesses a certain level of context sensitivity in order to assist in disambiguating different calls that are directed to the same method. As implemented, the points-to graph G' records dependency relations that exist between objects.

Within aspects of the present invention an analysis domain, is initially determined. In regard to the present disclosure, P indicates the union of the following two sets of Permission objects: those that the program under analysis requires to run without authorization failures and those granted to both the code and the principals by the current security policy database. Set P is the domain for the security policy analysis.

Determining the Permissions Granted to the Code

Every method in a program under analysis is implicitly granted permissions. To determine what permissions a method is granted, a static analysis would initially be utilized to determine a class to which the method belongs. Next, a determination is made to ascertain the component to which the class belongs (e.g., in Java™, the component would be the Java™ Archive (JA1E) file containing the class file). Lastly, a determination is made as to what permissions the component has been granted. As such, the permissions that have been granted to the component are those permissions that have been granted to the method. At the end of this process, each method m in the program under analysis is mapped to the permissions granted to its component.

At this point, each $n \in N$ can be mapped to the subset of P whose elements correspond to the access rights granted to the method represented by n. This defines a function $\Phi: N \to P(P)$, where P is the power-set operator. This function annotates the invocation graph as follows: For each node $n \in N$, $\Phi(n)$ represents the code-granted access rights under which the method represented by n will be executed at run time. To compute the values of function $\Phi$, it is necessary to iterate over all the invocation graph nodes. For each node n, the access rights that the security policy grants to the code source of the method represented by n must be identified.

Determining the Permissions Granted to the Subjects

A subject is granted the permissions of its encapsulated principals. To detect which permissions have been granted to each subject, initially, for each Subject object s in the program under analysis, the Principal objects encapsulated in the Subject object are determined by traversing the points-to graph starting at s. Next, for each Principal object p encapsulated in s, the security policy is consulted in order to determine the permission set that has been granted to p. Finally, the set of the permissions granted to s is determined to be the union of the permission sets granted to the Principal objects that are encapsulated within s.

Once a subject has been granted permissions, the code that the subject executes receives the permissions of the subject. To understand which permissions the code receives as a result of being executed by a subject, the invocation graph must be traversed to detect all the nodes responsible for adding the subject's permissions to the execution. On a Java™ platform, these nodes correspond to all the doAs and doAsPrivileged method invocations. Next, the Subject parameter is considered for each such node. Although doAs and doAsPrivileged take a Subject parameter, in the static analysis model more than one Subject object abstraction can be reported to have flowed to the formal parameter of a doAs or doAsPrivileged method.

Further, each doAs and doAsPrivileged node is mapped to the intersection of the sets of permissions granted to the Subject objects that can flow to the doAs or doAsPrivileged formal parameter according to the model. Lastly, the permission sets are propagated downwards within the invocation graph, performing set intersections at each merge point, until a fixed point is reached. As soon as the fix-point iteration above converges, each node n in G is mapped to the subset $\Sigma(n.)$ of P over approximating all the Permission objects under which the method represented by n will be executed at run time. This defines the function $\Sigma: N \to P(P)$.

Determining the Permissions Required by Code

The Java™ stack inspection mechanism can be defined as follows. Each checkPermission node is identified, along with the set of Permission objects that, according to the model, could flow to its Permission parameter. Such sets are then propagated backwards in the call graph, performing set unions at the merge points. The only nodes that stop the Permission propagation are the do Privileged nodes; such nodes do not propagate the Permission sets that they receive as part of the propagation process. This process is guaranteed to reach a fix point in $O(|E||P|)$ time. Next, all the doPrivileged nodes propagate all their Permission sets to their predecessors, to model the requirement that the caller of doPrivileged has to be granted the permissions that it is shielding its own callers from. This step has to be performed only once. It does not require the performance of fix-point iteration. At the end of this process, each node n in the call graph is mapped to a set $\Pi(n) \subseteq P(P)$ over approximating the permissions required to execute the method represented by n at run time. This defines a function $\Pi: N \to P(P)$.

Policy Evaluation

Within aspects of the present invention a policy evaluation analysis is performed to determine if any potential security problems exist within the analyzed program code. For each $n \in N$, the following potential inconsistencies for the method represented by n are identified:

1. If set $A_1(n)=\Pi(n)-(\Phi(n)\cup\Sigma(n))\neq\emptyset$, the authorizations granted to the program's code source and to the subjects executing the program are insufficient to cover the access-right requirements represented by the elements of $A_1$. A run-time authorization failure is possible when the method represented by n, in the context specified by n, is invoked. This can be avoided by granting that method's code source or the subjects executing that method the access rights in $A_1(n)$.

If set $A_2(n)=(\Phi(n)\cup\Sigma(n))-\Pi(n)\neq\emptyset$, the permissions represented by the elements of $A_2$ are unnecessary. This may constitute a violation of the Principle of Least Privilege, and can be avoided by not granting the code source of the method, represented by n and the subjects executing that, method the access rights in $A_2(n)$. It should be observed that, since the code source of the Java™ Runtime Environment (JRB) system classes is granted AllPermission, $A_2(n)$ is likely to be non-empty for any node n corresponding to the invocation of a method in the core libraries. To improve the usability of this technology, the values of $A_2$ for such nodes can be filtered out.

3. If set $A_3(n)=\Phi(n)\cap\Sigma(n)\neq\emptyset$, the permissions represented by the elements of $A_3$ are unnecessarily granted to both the code source of the method represented by n and the subjects executing that method. This potential violation of the Principle of feast Privilege can be avoided by not granting either the method's code source or the subjects executing that method the access rights in $A_3(n)$.

The output of the three functions $A_1, A_2, A_3:N\rightarrow P(P)$ are utilized to annotate the call graph and reveal what security and stability problems the program under analysis will potentially have at the time of program execution.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and -enhancements which fall within the scope of the claims which follow. These claims should be construed to maintain the proper protection for the invention first described.

What is claimed:

1. A method for the evaluation of security policies, the method further comprising the steps of:
  creating a static model of a program with a processor, wherein the static model comprises:
   an invocation graph (G=N, E), the invocation graph comprising a set of nodes (N) and a set of edges (E), the invocation graph being configured to visually represent programming methods as nodes, and the calling context that is associated with a respective programming method; and
   a points-to graph (G=N', E'), the points-to graph being configured to model the dependencies that exist between program objects;
  determining an analysis domain for a plurality of sets of permission objects;
  determining a set of explicitly granted permissions for respective program methods;
  determining a set of permissions that have been granted to each subject object by traversing the points-to graph;
  determining a set of subject-granted permissions that respective subject-executed code receives as a result of being executed by a subject object;
  determining a set of permissions that are required by the program code;
  performing a policy evaluation operation upon each identified method node; and
  annotating the invocation graph with information that is determined from the policy evaluation operation.

2. The method of claim 1, wherein the step of performing a policy evaluation operation comprises the step of determining an access right evaluation set, the access right evaluation set being based upon the resultant of operations utilizing the determined explicitly granted permissions, the subject-granted code permissions, and the permissions required by program code.

3. The method of claim 2, further comprising the step of determining a first access right evaluation set, wherein the event that the set of permissions required by program code contains elements that are not comprised within the union of the set of permissions explicitly granted to program code and the set of subject-granted permissions, then the permissions that comprise the first access right evaluation set are determined to be insufficient.

4. The method of claim 3, further comprising the step of determining a second access right evaluation set, wherein the event that the union of the set of permissions explicitly granted to program code and the set of subject-granted permissions contains elements that are not comprised within the set of permissions required by program code, then the permissions that comprise the second access right evaluation set are determined to be redundant.

5. The method of claim 4, further comprising the step of determining a third access right evaluation set, wherein the event that the intersection of the set of permissions explicitly granted to program code and the set of subject-granted permissions is not empty, then the permissions that comprise the third access right evaluation set are determined to be redundant.

6. The method of claim 5, wherein the step of annotating the invocation graph comprises annotating the invocation graph with the information that is obtained from the first, second, and third access right evaluation sets.

7. The method of claim 6, further comprising the step of analyzing the annotated invocation graph in order to determine the existence of security problems within the analyzed program.

8. The method of claim 6, further comprising the step of analyzing the annotated invocation graph in order to determine the existence of stability problems within the analyzed program.

9. A computer program product that includes a non-transitory computer readable medium useable by a processor, the medium having stored thereon a sequence of instructions which, when executed by the processor, causes the processor the evaluate current security policies granted to a specified code and subject, wherein the computer program product executes the steps of:

creating a static model of a program, wherein the static model comprises:

an invocation graph (G=N, E), the invocation graph comprising a set of nodes (N) and a set of edges (E), the invocation graph being configured to visually represent programming methods as nodes, and the calling context that is associated with a respective programming method; and a points-to graph (G=N', E'), the points-to graph being configured to model the dependencies that exist between program objects;

determining an analysis domain for a plurality of sets of permission objects;

determining a set of explicitly granted permissions for respective program methods;

determining a set of permissions that have been granted to each subject object by traversing the points-to graph;

determining a set of subject-granted permissions that respective subject-executed code receives as a result of being executed by a subject object;

determining a set of permissions that are required by the program code;

performing a policy evaluation operation upon each identified method node; and annotating the invocation graph with information that is determined from the policy evaluation operation.

10. The computer program product of claim 9, wherein the step of performing a policy evaluation operation comprises the step of determining an access right evaluation set, the access right evaluation set being based upon the resultant of operations utilizing the determined explicitly granted permissions, the subject-granted code permissions, and the permissions required by program code.

11. The computer program product of claim 10, further comprising the step of determining a first access right evaluation set, wherein the event that the set of permissions required by program code contains elements that are not comprised within the union of the set of permissions explicitly granted to program code and the set of subject-granted permissions, then the permissions that comprise the first access right evaluation set are determined to be insufficient.

12. The computer program product of claim 11, further comprising the step of determining a second access right evaluation set, wherein the event that the union of set of the permissions explicitly granted to program code and the set of subject-granted permissions contains elements that are not comprised within the set of permissions required by program code, then the permissions that comprise the second access right evaluation set are determined to be redundant.

13. The computer program product of claim 12, further comprising the step of determining a third access right evaluation set, wherein the event that the intersection of the set of the permissions explicitly granted to program code and the set of subject-granted permissions is not empty, then the permissions that comprise the third access right evaluation set are determined to be redundant.

14. The computer program product of claim 13, wherein the step of annotating the invocation graph comprises annotating the invocation graph with the information that is obtained from the first, second, and third access right evaluation sets.

15. An article of manufacture for the evaluation of security policies, the article of manufacture storing machine readable instructions, which when executed cause the machine to perform the steps of:

creating a static model of a program, wherein the static model comprises:

an invocation graph (G=N, E), the invocation graph comprising a set of nodes (N) and a set of edges (E), the invocation graph being configured to visually represent programming methods as nodes, and the calling context that is associated with a respective programming method; and a points-to graph, the points-to graph being configured to model the dependencies that exist between program objects;

determining an analysis domain for a plurality of sets of permission objects;

determining a set of explicitly granted permissions for respective program methods;

determining a set of permissions that have been granted to each subject object by traversing the points-to graph;

determining a set of subject-granted permissions that respective subject-executed code receives as a result of being executed by a subject object;

determining a set of permissions that are required by the program code;

performing a policy evaluation operation upon each identified method node by determining an access right evaluation set, the access right evaluation set being based upon the resultant of operations utilizing the determined explicitly granted permissions, the subject-granted code permissions, and the permissions required by program code; and annotating the invocation graph with information that is determined from the policy evaluation operation.

16. The article of manufacture of claim 15, further comprising the step of determining a first access right evaluation set, wherein the event the set of permissions required by program code contains elements that are not comprised within the union of the set of permissions explicitly granted to program code and the set of subject-granted permissions, then the permissions that comprise the first access right evaluation set are determined to be insufficient.

17. The article of manufacture of claim 16, further comprising the step of determining a second access right evaluation set, wherein the event that the union of the set of the permissions explicitly granted to program code and the set of subject-granted permissions contains elements that are not comprised within the set of permissions required by program code, then the permissions that comprise the second access right evaluation set are determined to be redundant.

18. The article of manufacture of claim 17, further comprising the step of determining a third access right evaluation set, wherein the event that the intersection of the set of the permissions explicitly granted to program code and the set of subject-granted permissions is not empty, then the set of permissions that comprise the third access right evaluation set are determined to be redundant.

19. The article of manufacture of claim 18, wherein the step of annotating the invocation graph comprises annotating the invocation graph with the information that is obtained from the first, second, and third access right evaluation sets.

\* \* \* \* \*